(12) United States Patent
Coonrod et al.

(10) Patent No.: US 6,575,347 B2
(45) Date of Patent: Jun. 10, 2003

(54) RIVET FEED SLIDER

(75) Inventors: John S. Coonrod, Rockford, IL (US); Jordan Kingsbury, Lindenwood, IL (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/875,747

(22) Filed: Jun. 6, 2001

(65) Prior Publication Data

US 2001/0052173 A1 Dec. 20, 2001

Related U.S. Application Data

(60) Provisional application No. 60/212,298, filed on Jun. 17, 2000.

(51) Int. Cl.$^7$ .................................................. B25C 5/02
(52) U.S. Cl. ........................ 227/112; 406/74; 406/112; 406/147
(58) Field of Search ........................ 406/149; 221/278; 227/112, 119

(56) References Cited

U.S. PATENT DOCUMENTS

| 2,961,046 | A | * | 11/1960 | Moeller et al. ......... 15/104.062 |
| 3,339,799 | A | * | 9/1967 | Spisak ........................ 219/98 |
| 3,883,040 | A | | 5/1975 | Bell |
| 4,222,495 | A | | 9/1980 | Kaneko |
| 4,363,753 | A | * | 12/1982 | Bozon et al. ............. 423/213.5 |
| 4,410,103 | A | * | 10/1983 | Fuhrmeister ................. 221/25 |
| 5,004,141 | A | | 4/1991 | Young et al. |
| 5,014,876 | A | | 5/1991 | Young et al. |
| 5,480,087 | A | | 1/1996 | Young et al. |
| 5,853,108 | A | | 12/1998 | Ando et al. |
| 6,227,437 | B1 | | 5/2001 | Razon et al. |
| 6,368,026 | B1 | * | 4/2002 | Takazawa ..................... 406/68 |

* cited by examiner

*Primary Examiner*—Joseph A. Dillon
(74) *Attorney, Agent, or Firm*—Trexler, Bushnell, Giangiorgi, Blackstone & Marr, Ltd

(57) ABSTRACT

A rivet feed slider configured to sequentially receive rivets from a rivet delivery path and feed the rivets to a rivet transport tube using an air supply. The rivet feed slider includes a rivet receiving chamber which is configured to sequentially receive the rivets, and an aperture is in communication with the rivet receiving chamber. The aperture allows air to flow from the air supply through the rivet receiving chamber to the rivet transport tube such that a rivet which is disposed in the rivet receiving chamber is moved into the rivet transport tube. The rivet feed slider also includes additional apertures which allow air to flow from the air supply to the rivet transport tube when the rivet receiving chamber is not aligned with the air supply. Hence, the air flow from the air supply to the rivet transport tube is not substantially disrupted.

10 Claims, 3 Drawing Sheets

RIVET FEED SLIDER

RELATED APPLICATION

This application claims the benefit of U.S. provisional application Serial No. 60/212,298, filed Jun. 17, 2000.

BACKGROUND

This invention generally relates to rivet feed sliders for feeding rivets to a rivet transport tube or similar structure, and more specifically relates to a rivet feed slider which improves the consistency and reliability of the delivery of rivets along a rivet transport tube to a carrier head of a rivet driving machine.

There are a variety of riveting machines for automatically or manually controlling the feeding of rivets to a carrier head. In such a riveting machine, rivets are transported, served, or otherwise moved from a bulk source of rivets to the carrier head of a rivet driving machine. One such transport system is an air feed system, while another is a tape feed system. Of these two systems, it is advantageous to deliver rivets using an air feed system because such a system is usually less costly and requires less processing steps.

In a prior art air feed system, a vibratory bowl feeder is used to sequence or otherwise deliver rivets in a sequential order. The vibratory bowl feeder delivers the sequentially-aligned rivets to a rivet delivery path whereafter the rivets are removed from the path, sequentially one by one, by a sliding mechanism. Such sliding mechanisms are useful to control the flow of rivets to a rivet delivery tube and sequence the rivets so that only one rivet is served to the carrier head at a time. The sliding mechanisms are positioned in the air flow path so that they can effectively use the air supply to serve rivets to the rivet transport tube.

A problem associated with prior art sliding mechanisms is that they tend to interrupt or reduce the air flow to the rivet delivery tube, specifically when the sliding mechanism is in the process of receiving another rivet to transport. Disrupting the flow to the rivet delivery tube, which ultimately communicates with the carrier head, is not desirable. Disruption of the air flow after a rivet has been delivered to the rivet transport tube can cause feeding errors. For example, the disruption may cause a rivet to bounce back out of the carrier head after it has been received by the carrier head. Such a situation indicates an empty carrier head and may result in the rivet not being properly positioned in the carrier head. This bouncing back of rivets out of the carrier head as a result of the disruption in air flow caused by the sliding mechanism also increases the wear on the components during use.

OBJECTS AND SUMMARY

A general object of an embodiment of the present invention is to provide a rivet feed slider which improves the consistency and reliability of the delivery of rivets along a rivet transport tube to a carrier head of a rivet driving machine.

Another object of an embodiment of the present invention is to provide a rivet feed slider which does not substantially disrupt air flow from an air supply to a rivet transport tube.

Briefly, and in accordance with at least one of the foregoing objects, an embodiment of the present invention provides a rivet feed slider for use in association with an air supply and a rivet transport tube in communication with a rivet driving machine. The rivet feed slider is configured to sequentially receive rivets from a rivet delivery path and feed the rivets to the rivet transport tube using the air supply. The rivet feed slider includes a body which has a rivet receiving chamber formed therein which is configured to sequentially receive the rivets, and an aperture is in communication with the rivet receiving chamber. The aperture allows air to flow from the air supply through the rivet receiving chamber to the rivet transport tube such that a rivet which is disposed in the rivet receiving chamber is moved into the rivet transport tube. The rivet feed slider also includes at least one additional aperture which allows air to flow from the air supply to the rivet transport tube when the rivet receiving chamber is not aligned with the air supply. Hence, the air flow from the air supply to the rivet transport tube is not substantially disrupted, and the consistency and reliability of the delivery of rivets along the rivet transport tube to the rivet driving machine is improved.

Preferably, the rivet feed slider includes a plurality of apertures besides the aperture which communicates with the rivet receiving chamber, and the apertures are configured such that the volume of air flowing into the rivet transport tube is increased and the pressure is reduced. The apertures may be elongated and may have a larger width (i.e. an increased cross-sectional area) than the aperture which communicates with the rivet receiving chamber, thereby providing the increased air flow volume and decreased pressure.

The external surface of the rivet feed slider may provide a channel which communicates with the rivet receiving chamber. The channel is configured to receive a tip or end of a rivet as the rivet feed slider slides, such that the channel facilitates the transport of the rivet into the rivet receiving chamber as the rivet feed slider slides into position relative to the rivet delivery path.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
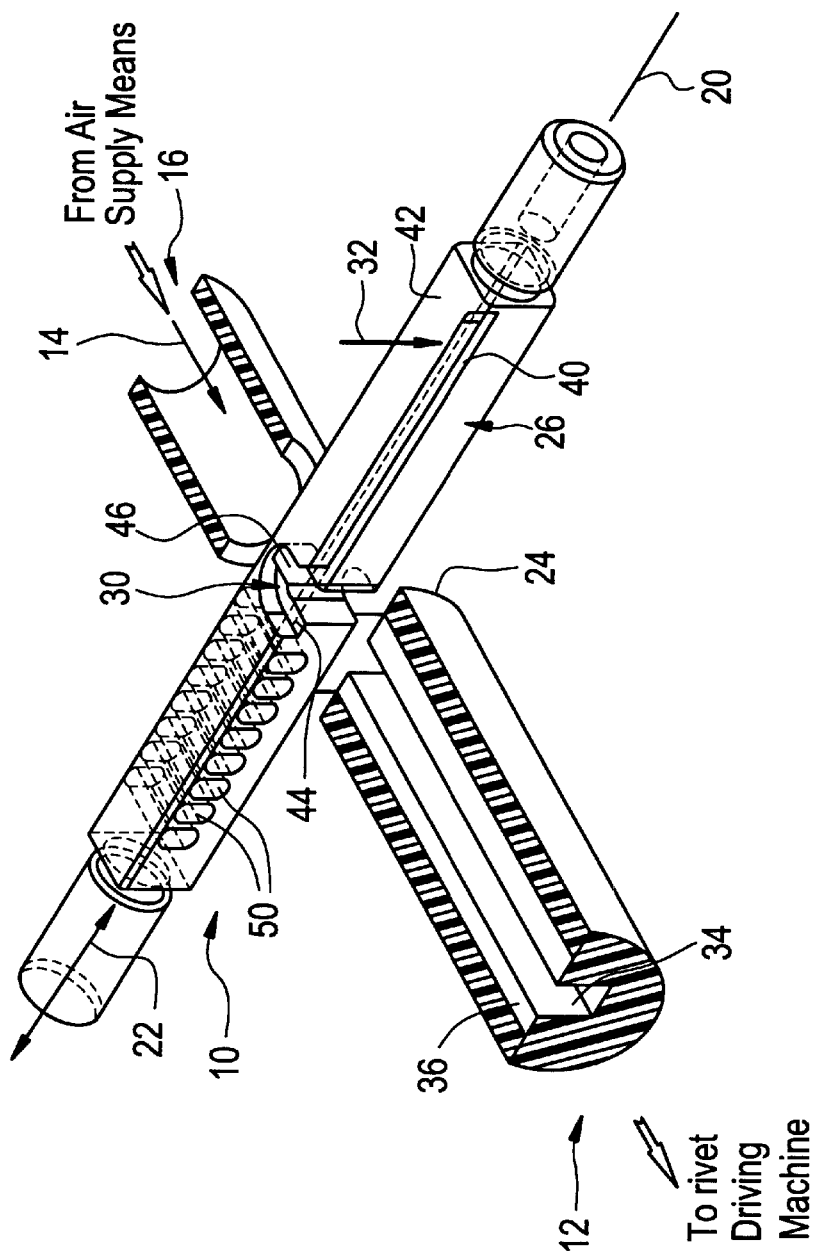
FIG. 1 is a perspective view showing a rivet feed slider in accordance with an embodiment of the present invention being used with an air delivery tube and rivet transport tube.

While the present invention may be susceptible to embodiment in different forms, there is shown in the drawings, and herein will be described in detail, an embodiment thereof with the understanding that the present description is to be considered an exemplification of the principles of the invention and is not intended to limit the invention to that as illustrated and described herein.

Figure 2:
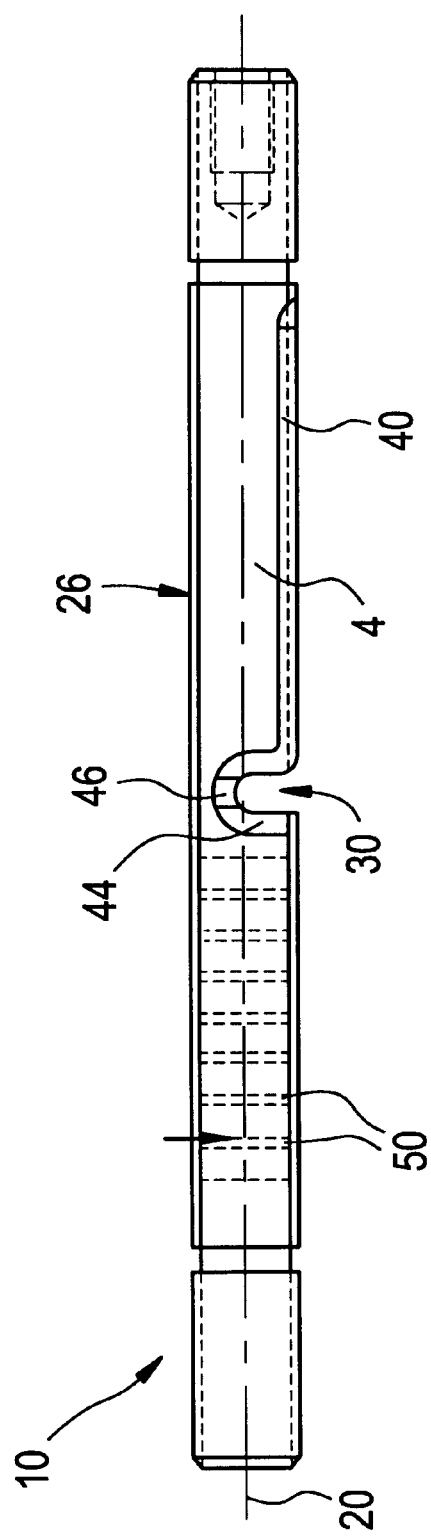
FIG. 2 is a top plan view of the rivet feed slider shown in FIG. 1.
Figure 3:
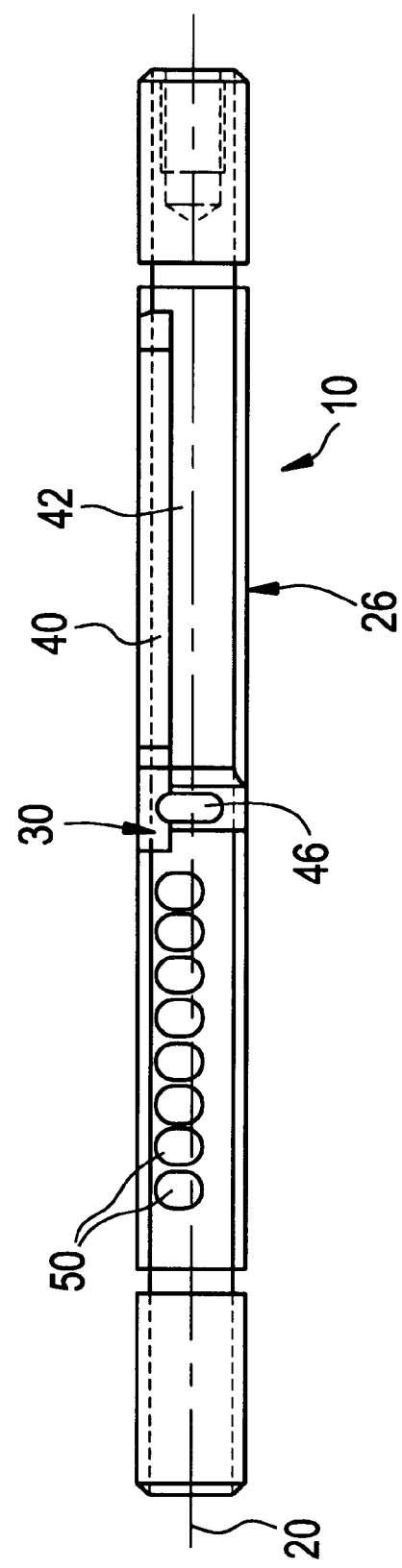
FIG. 3 is a front elevational view of the rivet feed slider shown in FIG.

FIGS. 1–3 show a rivet feed slider 10 which is in accordance with an embodiment of the present invention. The rivet feed slider 10 is configured such that it improves the consistency and reliability of the delivery of rivets along a rivet transport tube 12 (see specifically FIG. 1). The rivet feed slider 10 is configured such that, in use, it does not substantially disrupt the air flow (as represented by arrow 14 in FIG. 1) from an air supply or air delivery tube 16 to the rivet transport tube 12. Avoiding disrupting the air flow to the rivet transport tube 12 is desirable because disruption of the air flow after a rivet has been delivered to the rivet transport tube 12 can cause feeding errors and increase wear on the components.

With reference to FIG. 1, the rivet feed slider 10 is shown in a relative position near an air delivery tube 16 and a rivet transport tube 12. The air delivery tube 16 is in communication with an air supply means and hence forms an air supply for the rivet feed slider 10 and rivet transport tube 12, as will be more fully described below. The rivet transport tube 12 is in communication with a rivet driving machine or rivet driver. Specifically, the rivet transport tube 12 is preferably in communication with a carrier head of a rivet driving machine such that the rivet transport tube 12 is configured to feed rivets to the carrier head. The rivet feed slider 10 is disposed generally between the air delivery tube 16 and the rivet transport tube 12, and is configured to translate along a longitudinal axis 20 of the rivet feed slider 10 (as shown by arrow 22 in FIG. 1), generally perpendicular to the longitudinal axes of the air delivery tube 16 and the rivet transport tube. The details of the structure which facilitates the sliding of the rivet feed slider 10 between the air delivery tube 16 and rivet transport tube 12 is not specifically described herein, but is generally well known in the art.

Additionally, while there are couplings associated with the end 24 of the rivet transport tube 12 positioned proximate to the rivet feed slider 10 to promote smooth transition of the rivet from the rivet feed slider 10 to the rivet transport tube 12, and there are connections between the air delivery tube 16 and structure (not shown) which retains the rivet feed slider 10, these couplings and connections are not specifically shown as they are readily known in the art.

The rivet feed slider 10 includes a body 26 and a rivet receiving chamber 30 is formed in the body 26 and is configured to receive rivets sequentially (i.e. one at a time) from a rivet delivery path (represented by arrow 32 in FIG. 1) proximate the rivet feed slider. The rivet delivery path 32 is configured to deliver rivets downwardly into the rivet receiving chamber 30 of the rivet feed slider 10. The rivet delivery path 32 aligns with the rivet receiving chamber 30 when the rivet feed slider 10 slides into position relative to the rivet delivery path 32 such that the rivet receiving chamber 30 is aligned with (i.e. below) the rivet delivery path 32. The rivet delivery path 32 delivers or serves rivets to the rivet feed slider 10 from a bulk source such as a vibratory feeder, a cartridge, tape or some other delivery means.

In operation, the rivet feed slider 10 slides or moves toward the rivet delivery path 32 to position the rivet receiving chamber 30 therebelow. A rivet in the rivet delivery path 32 is then delivered to the rivet receiving chamber 30. Preferably, a sensing device (not shown) is used in association with rivet feed slider 10, and when the sensing device senses the presence of a rivet in the rivet receiving chamber 30, the rivet feed slider 10 is then slid or moved along arrow 22 in FIG. 1 such that the rivet receiving chamber 30 moves away from the rivet delivery path 32 and toward the rivet transport tube 12. The rivet receiving chamber 30 thereafter becomes aligned with the rivet transport tube 12 whereupon a flow of air from the air delivery tube 16 moves the rivet from the rivet receiving chamber 30 into the rivet transport tube 12.

Preferably, the rivet transport tube 12 is formed with a cross-section which generally corresponds to the outside dimensions of the rivet, as this works to orient the rivet in a desired position for delivery to the rivet driving machine with which the rivet transport tube 12 is in communication. Specifically, as shown in FIG. 1, the rivet transport tube 12 preferably has a cross-section which is generally T-shaped (specifically, FIG. 1 shows the lower portion 34 and upper edge 36 of the T-shaped cross-section).

As shown in FIGS. 1–3, a channel 40 is preferably formed on the external surface 42 of the rivet feed slider 10, and the channel 40 is elongated and communicates with the rivet receiving chamber 30. In use, a lower portion or tip of a T-shaped or headed rivet engages the channel 40 when the rivet receiving chamber 30 is not aligned with the rivet delivery path 32. The channel 40 effectively leads the rivet to the rivet receiving chamber 30 and facilitates receipt of the rivet by the rivet receiving chamber 30 once the rivet feed slider 10 has moved into position such that the rivet receiving chamber 30 has become aligned with the rivet delivery path 32. As shown in FIGS. 1 and 2, the rivet receiving chamber 30 preferably includes a ledge or shoulder 44 against which the head of a rivet rests when it has been received in the rivet receiving chamber 30. As shown, the channel 40 communicates with the ledge 44 of the rivet receiving chamber 30.

As shown in FIGS. 1–3, a primary aperture 46 communicates with the rivet receiving chamber 30, and extends to the external surface 42 of the rivet feed slider 10. The primary aperture 46 provides a passage through which air can flow from the air delivery tube 16 to the rivet transport tube 12 when the rivet feed slider 10 is positioned with the rivet receiving chamber 30 aligned with both the air delivery tube 16 and the rivet transport tube 12. The primary aperture 46 is preferably elongated to increase the air flow therethrough relative to the rivet against which the air pushes.

The rivet feed slider 10 also includes a plurality of elongated apertures 50 in addition to the primary aperture 46. The plurality of apertures 50 provide a path through which air flows from the air delivery tube 16 to the rivet transport tube 12, as the rivet receiving chamber 30 is axially displaced toward the rivet delivery path 32. As noted above, when the rivet receiving chamber 30 is positioned to communicate with the rivet transport tube 12 and deliver a rivet thereto, air flows from the air delivery tube 16 through the primary aperture 46. As the rivet feed slider 10 is axially displaced to move the rivet receiving chamber 30 in position to receive a rivet from the rivet delivery path 32, the apertures 50 maintain air flow through the rivet feed slider body 26.

The elongated configuration of the apertures 50 increases the volume of air flowing through tubes 16 and 12, at a reduced pressure. This air flow allows the rivet to move more consistently through the rivet transport tube 16, and into the carrier head at the rivet driving machine. The increased volume and reduced pressure preferably eliminates feeding errors at the carrier head. Such errors may occur as a result of increased pressure and reduced volume, causing the rivet to enter into the carrier head and bounce back out of the carrier head. Such a situation may cause the sensing device to indicate an empty carrier, or may result in the rivet not being properly positioned in the carrier head. Additionally, reduced bounce-back of the rivets relative to the carrier also helps to reduce wear on the components, including the carrier head.

As shown, the apertures 50 are preferably elongated and therefore provide increased air flow measured in the form of volume of air flow therethrough. The elongated design satisfies design parameters of providing increased air flow volume and maintaining the strength of the rivet feed slider 10. Preferably, the apertures 50 are of increased cross-sectional area (i.e. are wider) compared to aperture 46 so as to provide increased air flow volume at decreased pressure. Of course, other configurations may be used to provide the desired air flow.

In use, the rivet feed slider 10 is operatively positioned in a rivet feeding device of generally known construction, between an air delivery tube 16 and a rivet transport tube 12. The rivet feed slider 10 moves axially (along arrow 22) to receive rivets from the rivet delivery path 32 into the rivet receiving chamber 30. Subsequently, the rivet feed slider 10 axially moves in the opposite direction to deliver the rivet in the rivet receiving chamber 30 to the rivet transport tube 12. Once the rivet receiving chamber 30 is positioned relative to the rivet transport tube 12, air flowing through the air delivery tube 16 passes through the primary aperture 46 to drive the rivet from the rivet receiving chamber 30 to the rivet transport tube 12. The rivet is then transported through the rivet transport tube 12 to the rivet driving machine with which the rivet transport tube 12 is in communication. As the rivet is transported into and along the rivet transport tube 12, the rivet feed slider 10 moves axially to again align the rivet receiving chamber 30 with the rivet delivery path 32 such that the rivet receiving chamber 30 receives a subsequent rivet. As the rivet feed slider 10 moves axially, the plurality of apertures 50 align with the air delivery tube 16 and the rivet transport tube 12 to maintain air flow therethrough, thus continuing to drive the previously-served rivet to the rivet driving machine with which the rivet transport tube 12 is in communication.

As discussed above, preferably the apertures 50 are of increased cross-sectional area (i.e. are wider) compared to aperture 46 so as to provide increased air flow volume at a decreased pressure. The presence and configuration of the apertures 50 preferably increases the reliability and consistency in transporting rivets to the rivet driving machine.

While an embodiment of the present invention is shown and described, it is envisioned that those skilled in the art may devise various modifications of the present invention without departing from the spirit and scope of the appended claims.

What is claimed is:

1. A rivet feed system comprising: a rivet feed slider adapted for sliding between a first position and a second position; an air supply; and a rivet transport tube in communication with a rivet driving machine, said rivet feed slider configured to sequentially receive rivets from a rivet delivery path and feed the rivets to the rivet transport tube using the air supply, said rivet feed slider comprising a body, a rivet receiving chamber in said body, said rivet receiving chamber configured to sequentially receive the rivets, an aperture in communication with said rivet receiving chamber, said system configured such that, when said rivet feed slider is in said first position, air from the air supply flows through the aperture and rivet receiving chamber to the rivet transport tube such that a rivet which is disposed in the rivet receiving chamber is moved into the rivet transport tube, said rivet feed slider further comprising and at least one additional aperture, said system configured such that, when said rivet feed slider is in said second position, the rivet receiving chamber is not aligned with the air supply and air from the air supply flows through said at least one additional aperture to the rivet transport tube.

2. A rivet feed system as recited in claim 1, wherein said rivet receiving aperture includes a ledge continued to engage a head of the rivet.

3. A rivet feed system as recited in claim 1, further comprising a channel on an external surface of said rivet feed slider configured to receive at least a portion of a rivet, wherein said rivet receiving aperture includes a ledge configured to engage a head of the rivet, wherein said channel is in communication with said ledge.

4. A rivet feed system as recited in claim 1, further comprising a channel on an external surface of said rivet feed slider configured to receive at least a portion of a rivet.

5. A rivet feed system as recited in claim 4, wherein said channel is in communication with said rivet receiving chamber.

6. A rivet feed system as recited in claim 1, wherein the aperture which communicates with said rivet receiving chamber has a cross-sectional dimension and said at least one additional aperture has a cross-sectional dimension, wherein the cross-sectional dimension of said at least one additional aperture is greater than the cross-sectional dimension of the aperture which communicates with said rivet receiving chamber.

7. A rivet feed system as recited in claim 6, wherein the greater cross-sectional dimension of said at least one additional aperture provides increased air flow volume and lower pressure compared to when the air flows through said aperture which communicates with said rivet receiving chamber.

8. A rivet feed system slider as recited in claim 1, wherein the rivet feed slider includes a plurality of apertures which allow air to flow from the air supply to the rivet transport tube when the rivet receiving chamber is not aligned with the air supply.

9. A rivet feed system as recited in claim 8, wherein the plurality of apertures are wider than the aperture which communicates with said rivet receiving chamber.

10. A rivet feed system as recited in claim 8, wherein said plurality of apertures provide increased air flow volume and lower pressure compared to when the air flows through said aperture which communicates with said rivet receiving chamber.

* * * * *

UNITED STATES PATENT AND TRADEMARK OFFICE
CERTIFICATE OF CORRECTION

PATENT NO. : 6,575,347 B2  Page 1 of 1
DATED : June 10, 2003
INVENTOR(S) : John S. Coonrod and Jordan Kingsbury It is certified that error appears in the above-identified patent and that said Letters Patent is hereby corrected as shown below:

Column 2,
Line 48, "FIG." should be -- FIG. 1. --

Signed and Sealed this

Twenty-sixth Day of August, 2003

JAMES E. ROGAN
*Director of the United States Patent and Trademark Office*